(12) United States Patent
Mott, Jr. et al.

(10) Patent No.: US 12,178,191 B2
(45) Date of Patent: Dec. 31, 2024

(54) COLLAR WITH INTEGRATED DEVICE ATTACHMENT

(71) Applicant: MARS, INCORPORATED, McLean, VA (US)

(72) Inventors: Robert W. Mott, Jr., San Francisco, CA (US); Kyu Sang Lee, San Jose, CA (US); Stanley John Withouski, IV, San Francisco, CA (US)

(73) Assignee: Mars, Incorporated, McLean, VA (US)

( * ) Notice: Subject to any disclaimer, the term of this patent is extended or adjusted under 35 U.S.C. 154(b) by 658 days.

(21) Appl. No.: 17/294,156

(22) PCT Filed: Nov. 18, 2019

(86) PCT No.: PCT/US2019/061965
§ 371 (c)(1),
(2) Date: May 14, 2021

(87) PCT Pub. No.: WO2020/102799
PCT Pub. Date: May 22, 2020

(65) Prior Publication Data
US 2022/0000074 A1 Jan. 6, 2022

Related U.S. Application Data

(60) Provisional application No. 62/768,414, filed on Nov. 16, 2018.

(51) Int. Cl.
*A01K 27/00* (2006.01)
(52) U.S. Cl.
CPC .......... *A01K 27/001* (2013.01); *A01K 27/008* (2013.01)
(58) Field of Classification Search
CPC .. A01K 27/001; A01K 27/006; A01K 27/009; A01K 27/008
(Continued)

(56) References Cited

U.S. PATENT DOCUMENTS 9,451,821 B1 9/2016 Estigoy
10,021,946 B2 7/2018 Kaneko
(Continued)

FOREIGN PATENT DOCUMENTS

WO WO-2021203166 A1 * 10/2021 ........... A01K 11/006

OTHER PUBLICATIONS

European Search Report issued in European Application No. 19883374.1 dated Jan. 30, 2023 (9 pages).
(Continued)

*Primary Examiner* — Kristen C Hayes
(74) *Attorney, Agent, or Firm* — Bookoff McAndrews, PLLC

(57) ABSTRACT

Disclosed is a mounting base (300) for attaching a portable electronic device (402) to a collar apparatus (400). Mounting base (300) includes a frame (102) and a latch (200). Latch (200) is moveable between a latched position and an unlatched position. Latch (200) includes an actuator (206) with a button (208) that may be depressed by a user to manually move latch (200) between the latched and unlatched positions. A portable electronic device (402) includes an insertion portion (410) that is received in a receiving aperture (108) in the frame (102). Once the insertion portion (410) is inserted, the device (402) may be rotated manually to engage latch (200). During rotation, a lock stub (216) on latch (200) engages a corresponding feature on insertion portion (410), thereby preventing counter-rotation of device (402). Additionally, one or more tabs (120) on frame (102) interfere with corresponding structure on insertion portion (410) to secure device (402) onto mounting base (300).

9 Claims, 19 Drawing Sheets

(58) Field of Classification Search
USPC .................................................... 2/312, 319
See application file for complete search history.

(56) References Cited

U.S. PATENT DOCUMENTS

| | | | |
|---|---|---|---|
| 10,376,020 B1* | 8/2019 | Doyle | A44B 11/28 |
| 2014/0290013 A1* | 10/2014 | Eidelman | A01K 27/008 |
| | | | 24/593.1 |
| 2016/0262527 A1 | 9/2016 | Xu | |
| 2018/0098525 A1* | 4/2018 | Lee | A01K 27/008 |

OTHER PUBLICATIONS

International Search Report and Written Opinion, International Appln. No. PCT/US2019/061965, dated Feb. 4, 2020, 14 pgs.

* cited by examiner

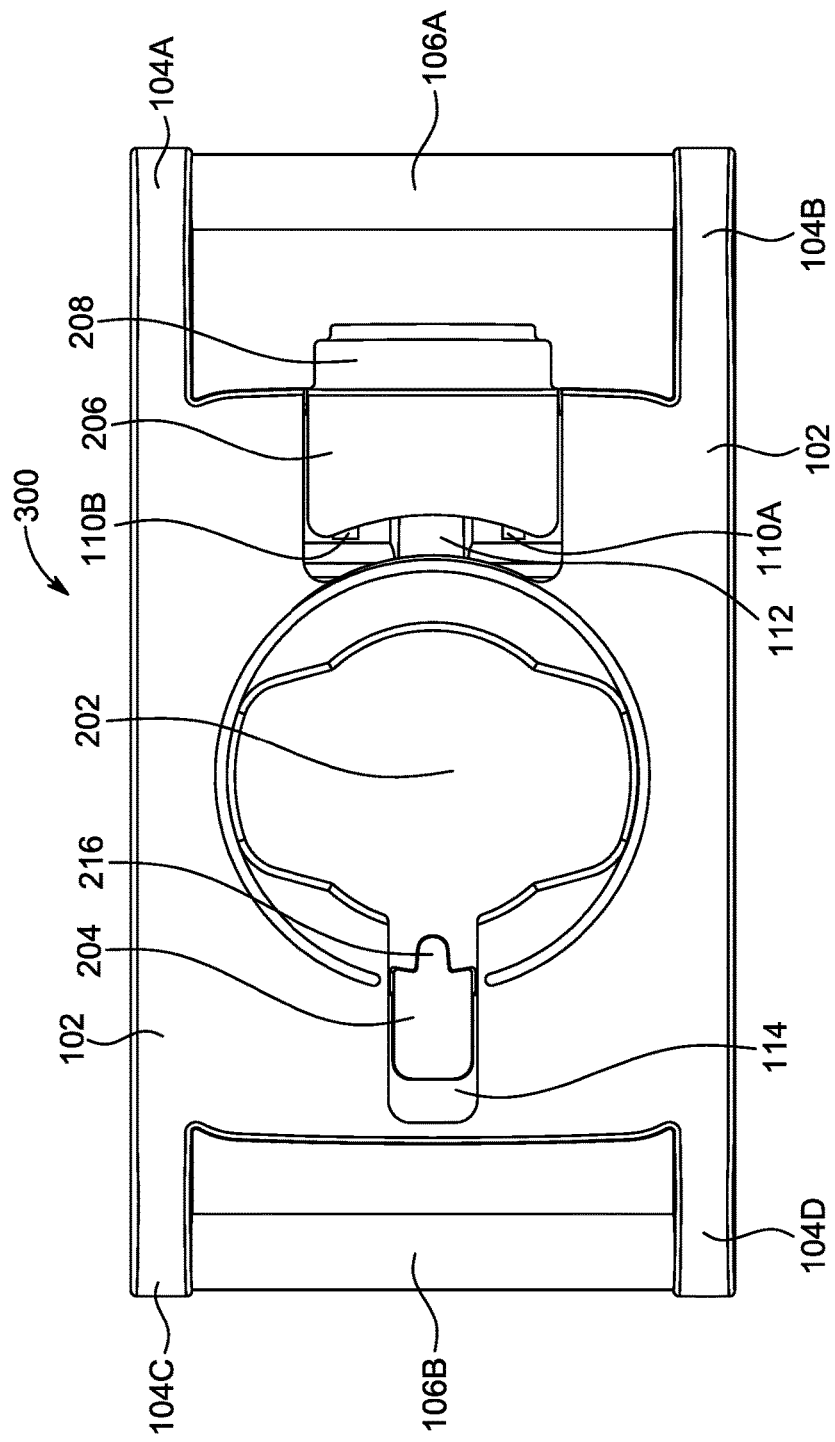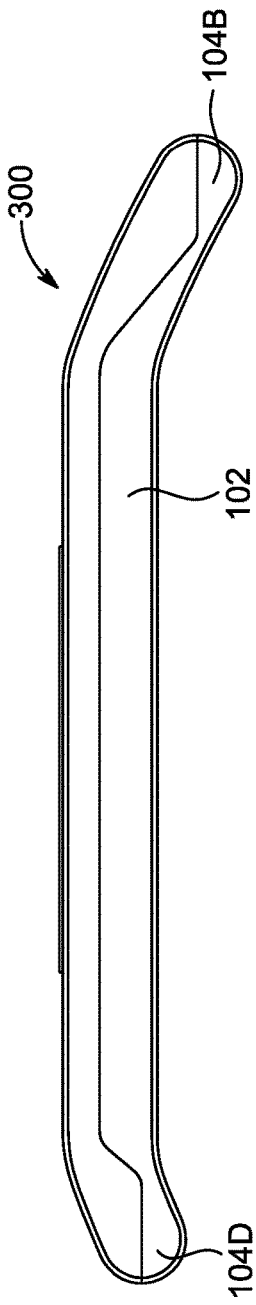
FIG. 2C
FIG. 2D

COLLAR WITH INTEGRATED DEVICE ATTACHMENT

CROSS-REFERENCE TO RELATED APPLICATIONS

This application is a national application filed under 35 U.S.C. § 371 of International Application No. PCT/US2019/061965, filed Nov. 18, 2019, which claims the benefit of priority to U.S. Provisional Application No. 62/768,414, filed Nov. 16, 2018, for which the entire contents of each are hereby incorporated by reference in their entireties.

TECHNICAL FIELD

The embodiments described in the disclosure relate to the field of accessory assemblies and specifically, to an accessory assembly designed to removably attach a portable electronic unit to an animal band or collar.

BACKGROUND ART

The embodiments described in the disclosure relate to the field of accessory assemblies and specifically, to an accessory assembly designed to removably attach a portable electronic unit such as a tracking device or activity monitor to an animal band or collar.

Various accessories connected to animal collars are currently known in the art. For example, many owners supply pets with identification tags to aid retrieval in the event an animal is lost or strays. Typically, such tags are attached to collars via key ring or split ring design wherein a circular hole within the tag is connected to a ring attached to the collar via the split ring. Alternative designs include "thread-through" designs wherein an attachment contains two slit-shaped receptacles on either end of the attachment allowing a collar to be "thread through" the attachment. Alternative designs also include "clasp" designs wherein a clasp is designed to clip onto a collar. Often, these clips are formed as part of the attachment itself.

The current state of the art suffers from numerous deficiencies. First, split ring designs are incapable of supporting heavier loads without injury to pets. Thus, are impractical for attachments exceeding a trivial weight. For example, the disclosure describes embodiments that may be used with GPS trackers or activity trackers for pets, which cannot be utilized with split ring designs due to weight restrictions or other size constraints. Additionally, thread-through or clasp designs are impractical for advanced attachments as such designs either require the replacement of an existing collar or are required to be replaced with each device, thus resulting in significant waste. Further, many designs additionally lack a locking mechanism designed to lock an attachment securely in place while also allowing a user to remove the attachment when required.

DISCLOSURE OF INVENTION

To remedy the aforementioned deficiencies, the disclosure presents an accessory assembly for coupling a unit to an animal band, and an animal collar assembly including such a feature.

In one embodiment, the apparatus includes a mounting base having a frame and a latch disposed on the frame. The latch is selectively moveable relative to the frame between a latched position and an unlatched position. The latch is biased in the latched position when not actuated by the user. A portable electronic device is configured to be removably securable to the frame using the latch.

In additional embodiments, the portable electronic device is secured in place on the mounting base using both the latch and a manual rotation of the device relative to the frame causing structures on the device to mechanically engage or interfere with corresponding tab structures on the frame, and also causing the latch to engage the device to prevent unintentional counter-rotation of the device relative to the frame. The dual action of rotating the device relative to the frame to engage corresponding tab structures and also securing the device in the desired angular position relative to the frame using the latch provides advantages over conventional devices by securely fastening the device to the base in a selectively removable position. To remove the portable device from the frame, for example for recharging or replacement, the latch is manually released by pressing an actuator to release the latch, and the device may then counter-rotated relative to the frame to allow the device to be removed from the frame.

In further embodiments, the accessory assembly comprises a support frame, the support frame including a locking gap positioned on one end of the support frame, a latch protrusion positioned on the other end of the support frame, a proximally positioned receiving aperture; and a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

BRIEF DESCRIPTION OF DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 2A illustrates the support frame and latch assembly in a latched position.

FIG. 2B illustrates the support frame and latch assembly in a partially assembled state where the latch is partially inserted into the frame.

FIG. 2C is a top plan view of a combined support frame and latch assembly according to some embodiments of the disclosure.

FIG. 2D is a side elevation view of a combined support frame and latch assembly according to some embodiments of the disclosure.

MODES FOR CARRYING OUT THE INVENTION

Figure 1A:
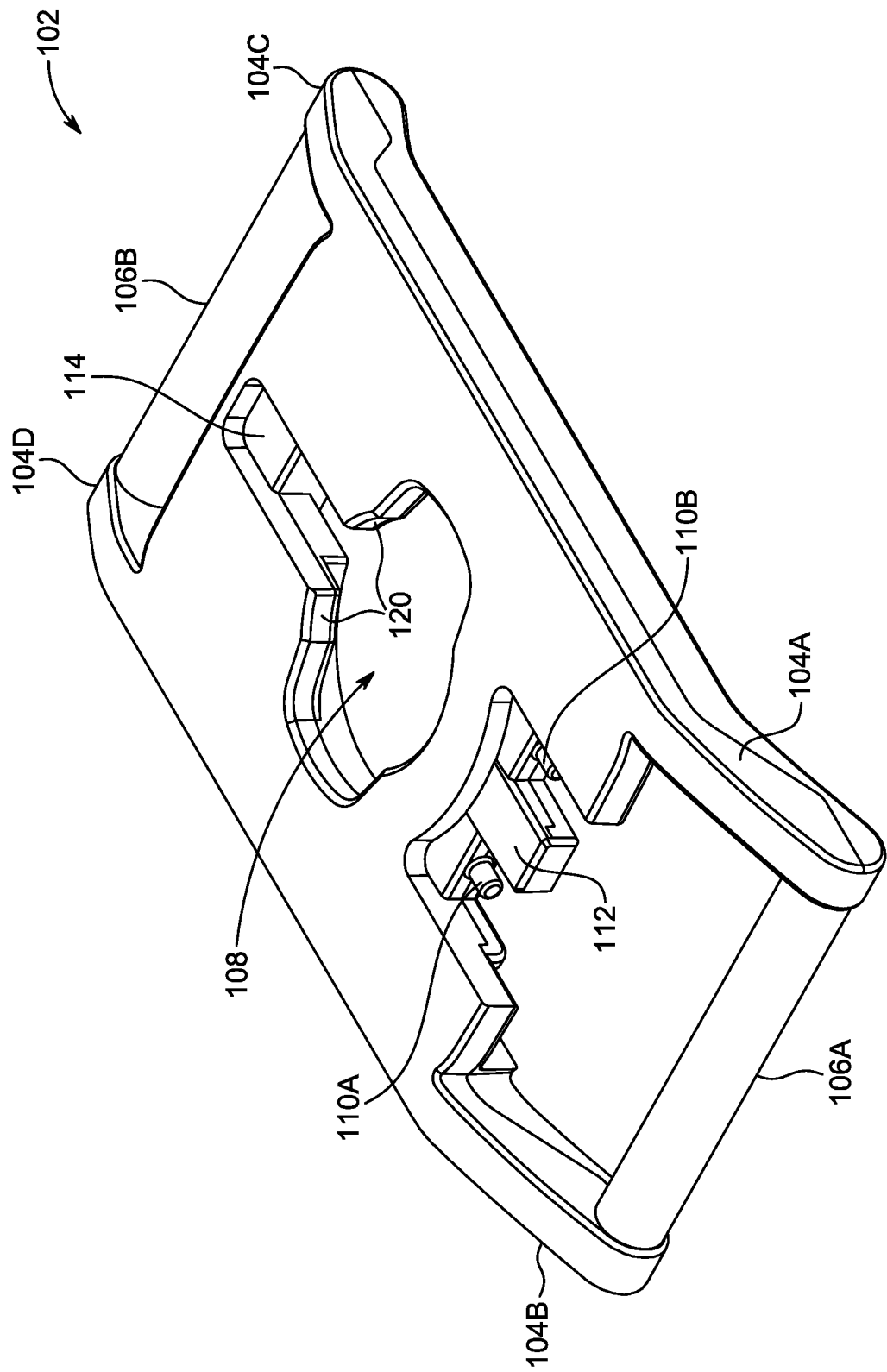
FIG. 1A is a top side perspective view of a support frame according to some embodiments of the disclosure.
Figure 1B:
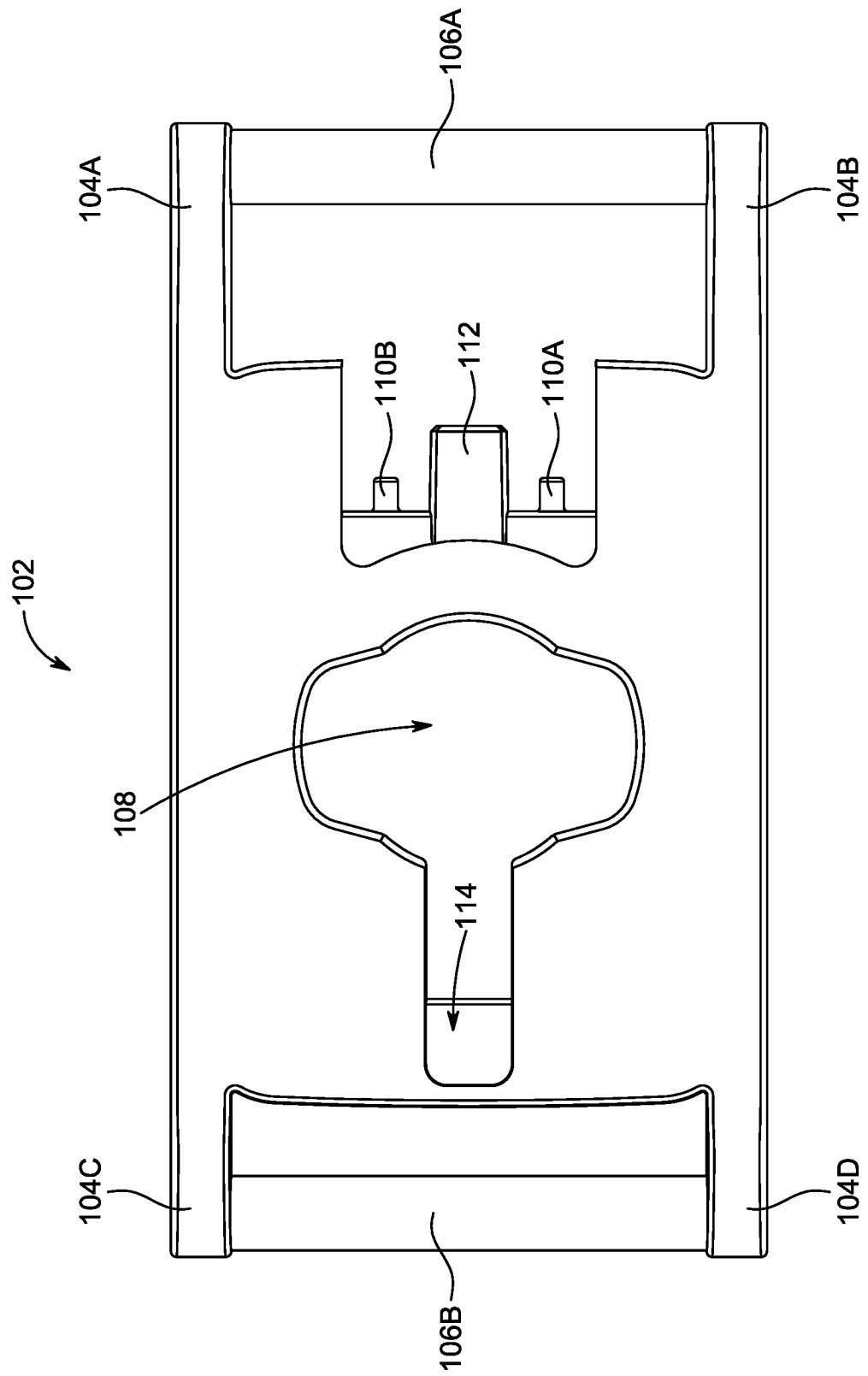
FIG. 1B is a top plan view of a support frame according to some embodiments of the disclosure.

The disclosure provides a device for attaching a portable electronic device to an animal collar. The device includes a mounting base having a frame and a latch disposed on the frame. The latch is selectively moveable relative to the frame between a latched position and an unlatched position. The latch is biased in the latched position when not actuated by the user. A portable electronic device such as a battery-powered activity monitor or tracking device is configured to be removably attached to the mounting base using the frame and latch.

In additional embodiments, the portable electronic device is secured in place on the mounting base using both the latch and a manual rotation of the device relative to the frame causing one or more structures on the device to engage or interfere with corresponding tabs on the frame while also causing a one or more structures on the latch to engage corresponding structure on the device. This engagement prevents unintentional counter-rotation of the device relative to the frame when the latch is in the latched position. The dual action of rotating the device relative to the frame to secure the device in a desired angular position relative to the frame while also using the latch to prevent counter-rotation of the device provides advantages over conventional devices. To remove the portable device from the frame, the latch is manually released by pressing an actuator and the device is then counter-rotated relative to the frame to allow the device to be removed from the frame.

The disclosed embodiments also describe a support frame and latch assembly. The support frame includes a receiving aperture for connecting a portable unit or other device and two oppositely positioned bars for retaining a strap or other member. The support frame is constructed with various features to mate with the latch assembly. The latch is coupled to the support frame by opposing forces on opposite ends of the latch. Springs are employed to allow the latch to be opened and closed and biased in a latched position.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIGS. 1A-1E are various views of a support frame according to some embodiments of the disclosure.

As illustrated in FIG. 1A, an accessory assembly includes a frame 102. In one embodiment, frame 102 may comprise a hard, plastic structure designed to retain external devices via the receiving aperture 108. In one embodiment, the frame 102 comprises a single structure formed via plastic injection molding. Alternatively, the frame 102 may comprise a single, stainless steel or other alloy material (e.g., SS 316L or 17-4PH).

As illustrated, frame 102 includes a substantially planar body portion and first, second, third and fourth legs 104A, 104B, 104C and 104D, respectively. As described above, legs 104A, 104B, 104C and 104D may comprise part of the frame. Alternatively, legs 104A-104D may be separate structures connected to frame 102 (e.g., fastened or welded structures). First and second legs 104A and 104B are longer than third and fourth legs 104C and 104D in some embodiments, however in other embodiments all four legs comprise the same length.

A first bar 106A spans between first and second legs 104A and 104B. Similarly, a second bar 106B spans between third and fourth legs 104C and 104D. Similar to the legs, first and second bars 106A, 106B may be formed as part of the entire structure of the frame 102 or may be separate structures fastened, welded or otherwise attached to the frame 102. As illustrated, legs 104A-104D bend slightly toward the bottom side of the assembly 100 in some embodiments. In other embodiments, the legs 104A-104D may be straight or at other angles. As will be illustrated and discussed in more detail, the apertures formed between bars 106A, 106B and the planar portion of the frame 102 are designed to receive a strap or other material, thus allowing the assembly to be retained onto an existing material. In one embodiment, the strap comprises an animal collar.

In the illustrated embodiments shown in FIGS. 1A-1E, the frame 102 is further configured to retain a portable electronic device or other charm attachment. However, the disclosed embodiments are not limited to retaining electronic devices and, any device may be connected using the assembly and latch described herein. In general, the latch (discussed infra) and receiving aperture 108 allows for the retention of a portable unit by exerting positive inward pressure toward the center of the aperture.

Referring further to FIGS. 1A-1E, the frame 102 includes a locking gap 114. The locking gap 114 comprises a depressed section of the frame formed during production and is designed to receive a locking mechanism of a latch (described infra). The locking gap 114 enables the locking mechanism to lay flat against the frame and prevents movement or shaking of the latch during operation, thus acting like a guide during movement of the latch as well as allowing for alignment of the latch.

The frame additionally includes a latch protrusion 112. In one embodiment, latch protrusion 112 may be coupled or fused to frame 102 and may comprise a horizontal protrusion extending outward away from aperture 108. Like the locking cap, the latch protrusion 112 allows for proper alignment of the latch. The latch protrusion 112 is inserted into an opening of a latch, allowing for coupling of the latch with the frame 102 (as will be discussed in more detail).

Frame 102 additionally includes two spring pegs 110A, 110B. The spring pegs 110A, 110B comprise molded extrusions from the frame 102 that are used to hold two springs. Operation of these springs is described in more detail herein.

Figure 1C:
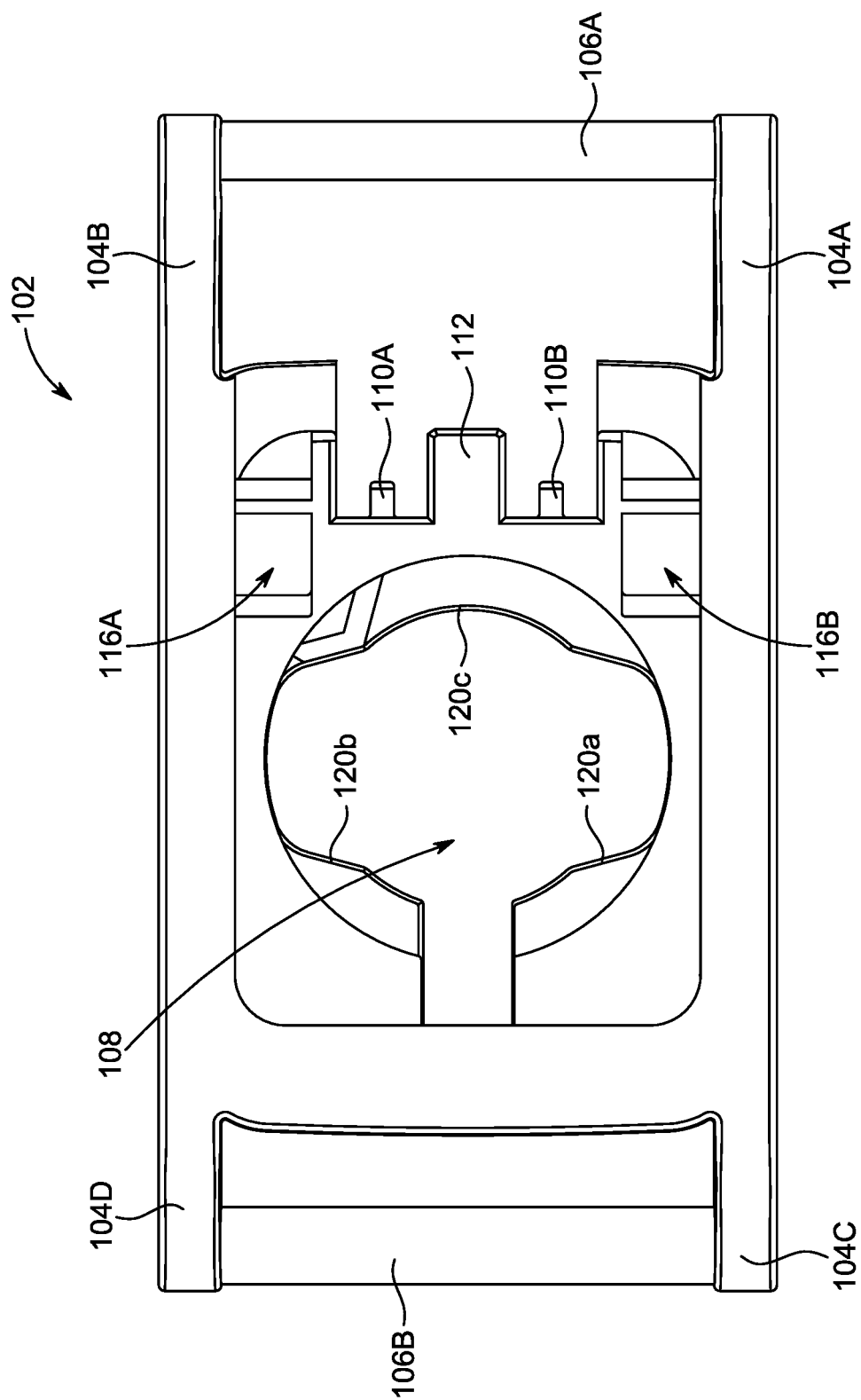
FIG. 1C is a bottom plan view of a support frame according to some embodiments of the disclosure.
Figure 1D:
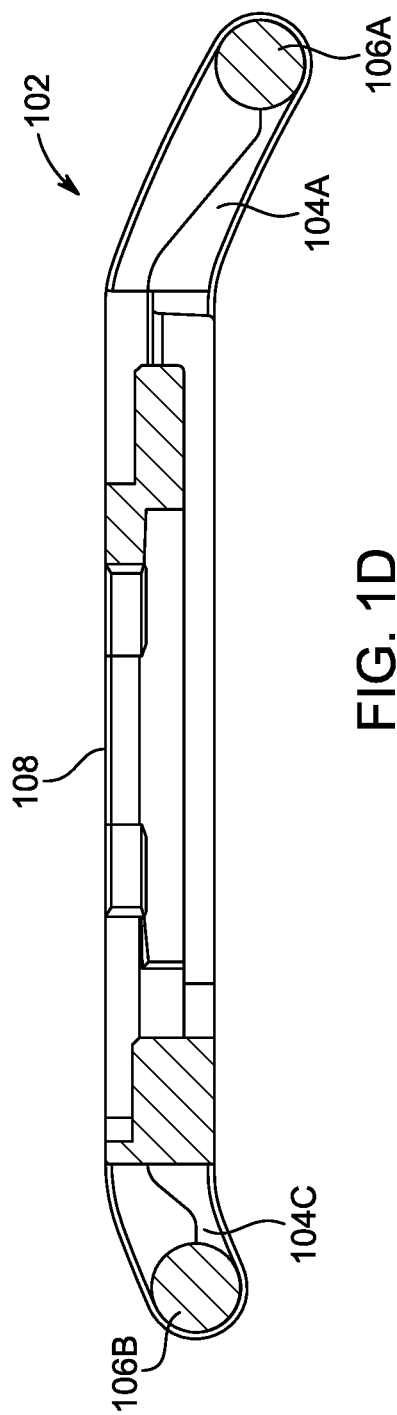
FIG. 1D is a cross-section view of a support frame according to some embodiments of the disclosure.
Figure 1E:
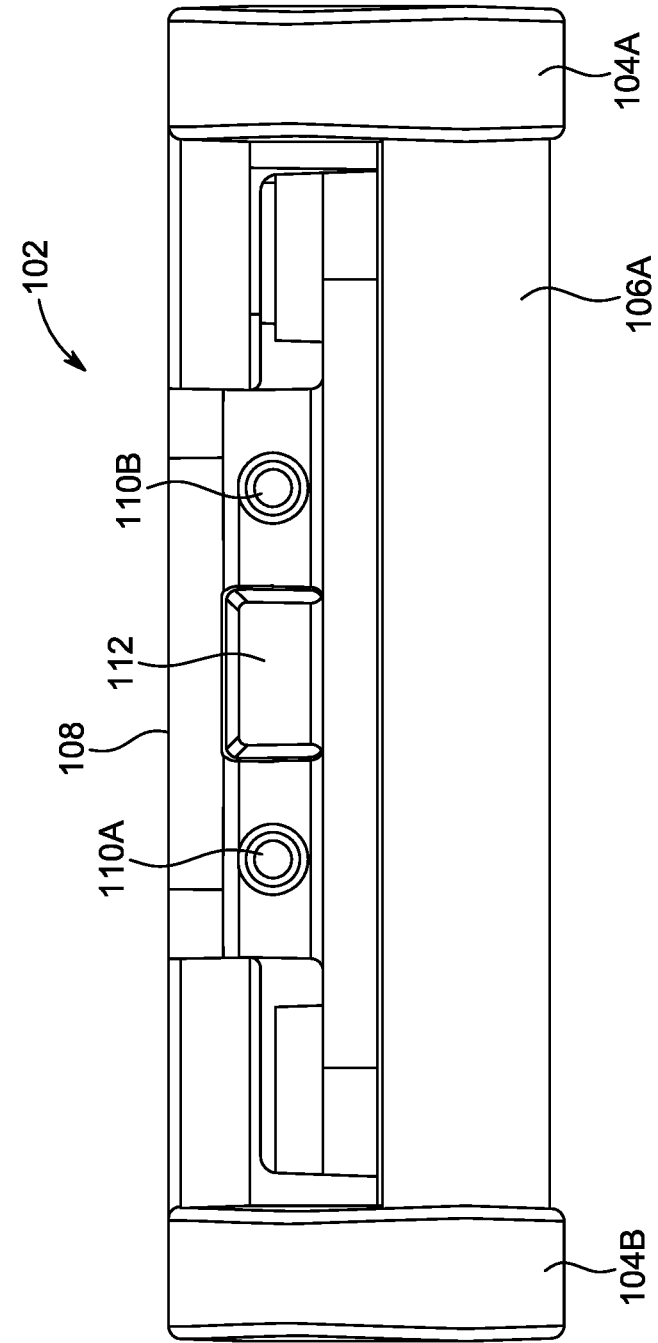
FIG. 1E is a front elevation view of a support frame according to some embodiments of the disclosure.
Figure 2A:
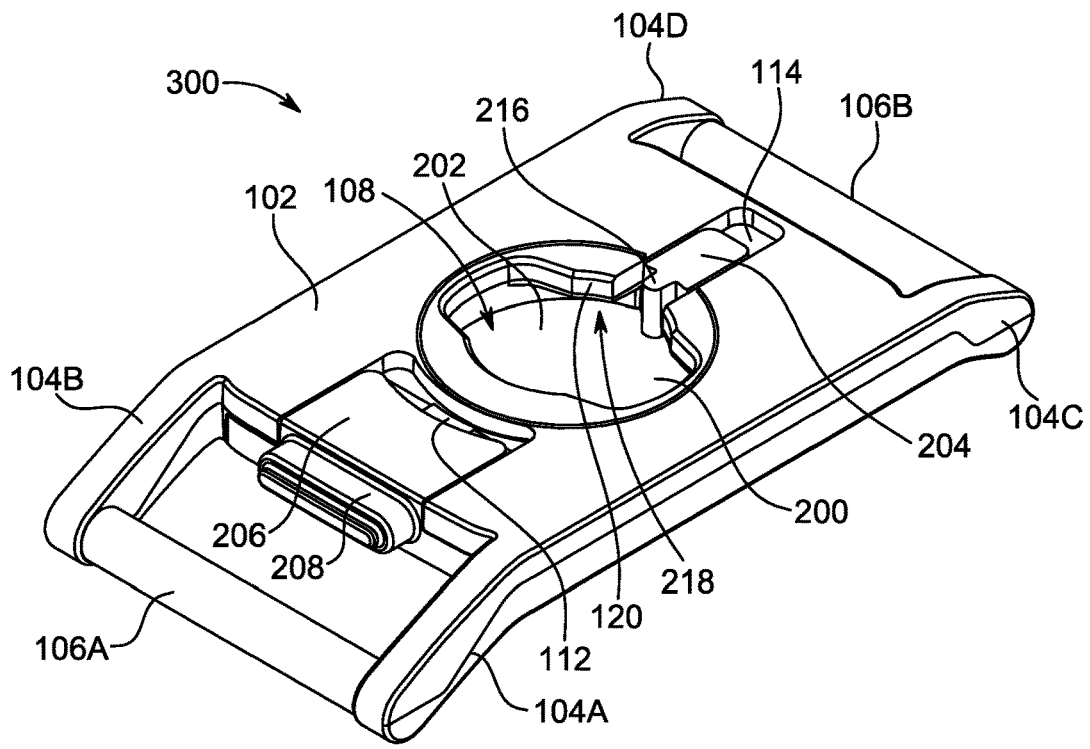
FIG. 2A is a perspective view of a combined support frame and latch assembly according to some embodiments of the disclosure.
Figure 2B:
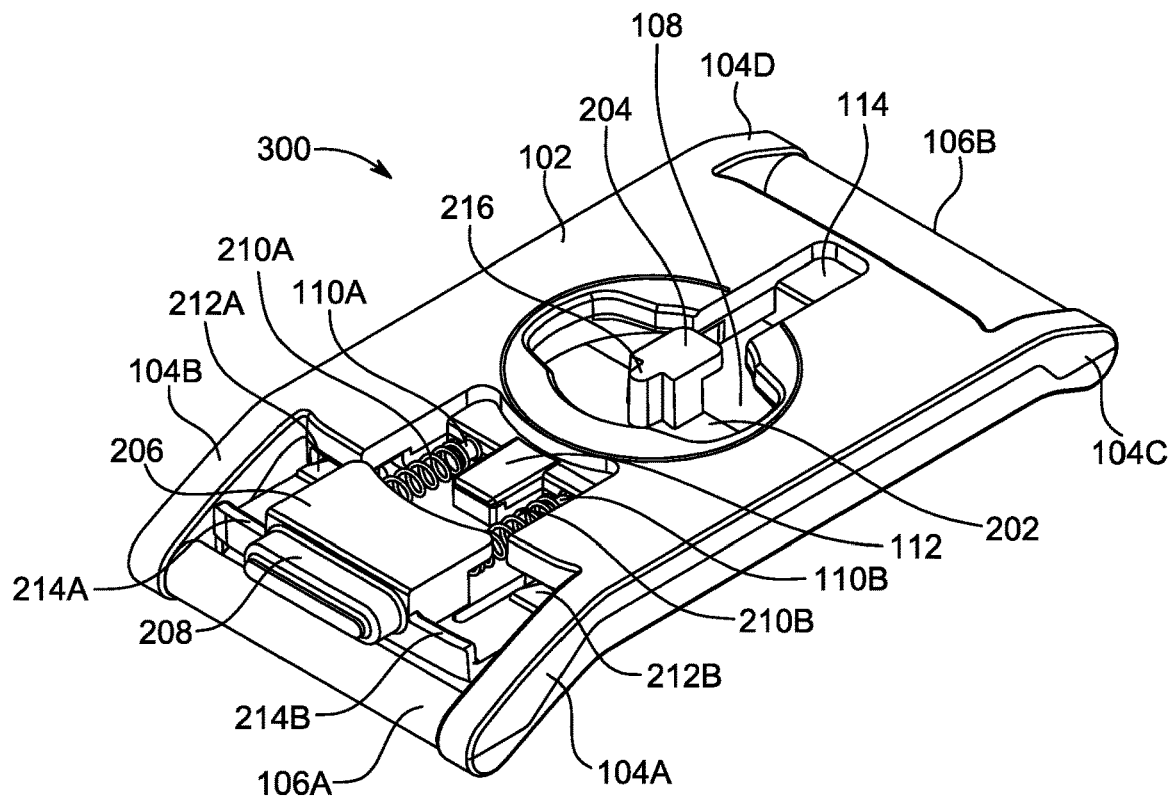
FIG. 2B is a perspective view of a combined support frame and latch assembly according to some embodiments of the disclosure.
Figure 2E:
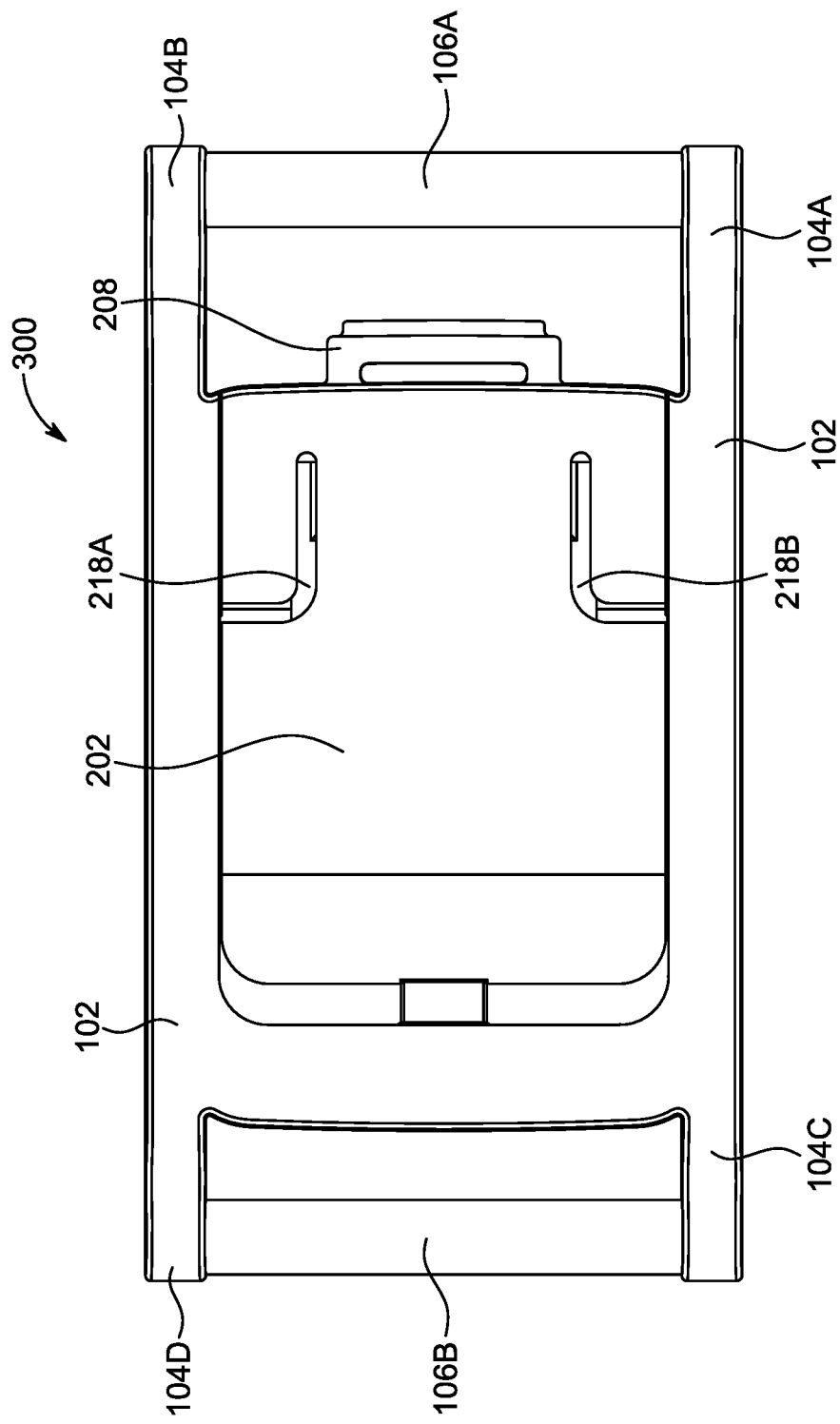
FIG. 2E is a bottom plan view of a combined support frame and latch assembly according to some embodiments of the disclosure.

As illustrated in FIG. 1C, the bottom side of the frame 102 includes two wedge receptacles 116A, 116B. A latch may include a plurality of wedges. In the illustrated embodiments, the wedges may be inserted into respective wedge receptacles 116A, 116 on the underside of frame 102. Thus, in operation, wedges may be slid under frame 102 and inserted into wedge receptacles 116A, 116B such that a latch is positioned flush with support frame. A latch inserts into frame 102 until the latch wedges engage wedge receptacles 116A, 116B on the bottom side of frame 102. Thus, upon activation of the wedges, the springs attached to pegs 110A, 110B are partially compressed and apply an outward force on an actuator of the latch, which is counteracted by positioning of the wedges in the wedge receptacles 116A, 116B.

FIGS. 2A-2E are various views of a mounting base 300 including a combined support frame 102 and latch assembly 200 according to some embodiments of the disclosure.

FIGS. 3A-3E are various views of a latch assembly 200 according to some embodiments of the disclosure.

In the embodiments illustrated in FIGS. 2A-2E, a mounting base 300 includes a latch 200 inserted into frame 102. The latch 200 is spring loaded, allowing for the opening and closing of the latch. Latch 200 includes a locking mechanism 204 and a lock stub 216 protruding from the locking mechanism toward receiving aperture 108. The mechanism guides the latch 200 during movement and the lock stub 216 prevents the rotation of a charm or portable electronic device when inserted into the receiving aperture 108. Latch 200 is moveable between a latched position and an unlatched position relative to frame 102. Latch 200 additionally includes an actuator 206 with a button 208 that enables the opening and closing, or latching and unlatching, of the latch. Latch 200 is coupled to the frame 102 via springs 210A, 210B which exert force outward, away from the assembly. Latch 200 is retained within the frame 102 via wedges 212A, 212B which slide into wedge receptacles 116A, 116B to secure the latch in place relative to the frame. The wedges 212A, 212B are separated by gaps 218A, 218B which allow them to bend and flex when the latch 200 is inserted into the support frame. Lock stub 216 is biased toward receiving aperture 108 when latch 200 is in the latched position. The bias of lock stub 216 toward receiving aperture 108 is provided by one or both springs 210A, 210B in some embodiments. Pushing the button 208 retracts lock stub 216 away from receiving aperture 108 which allows the portable electronic device attached to the mounting base to be rotated and removed.

Figure 3A:
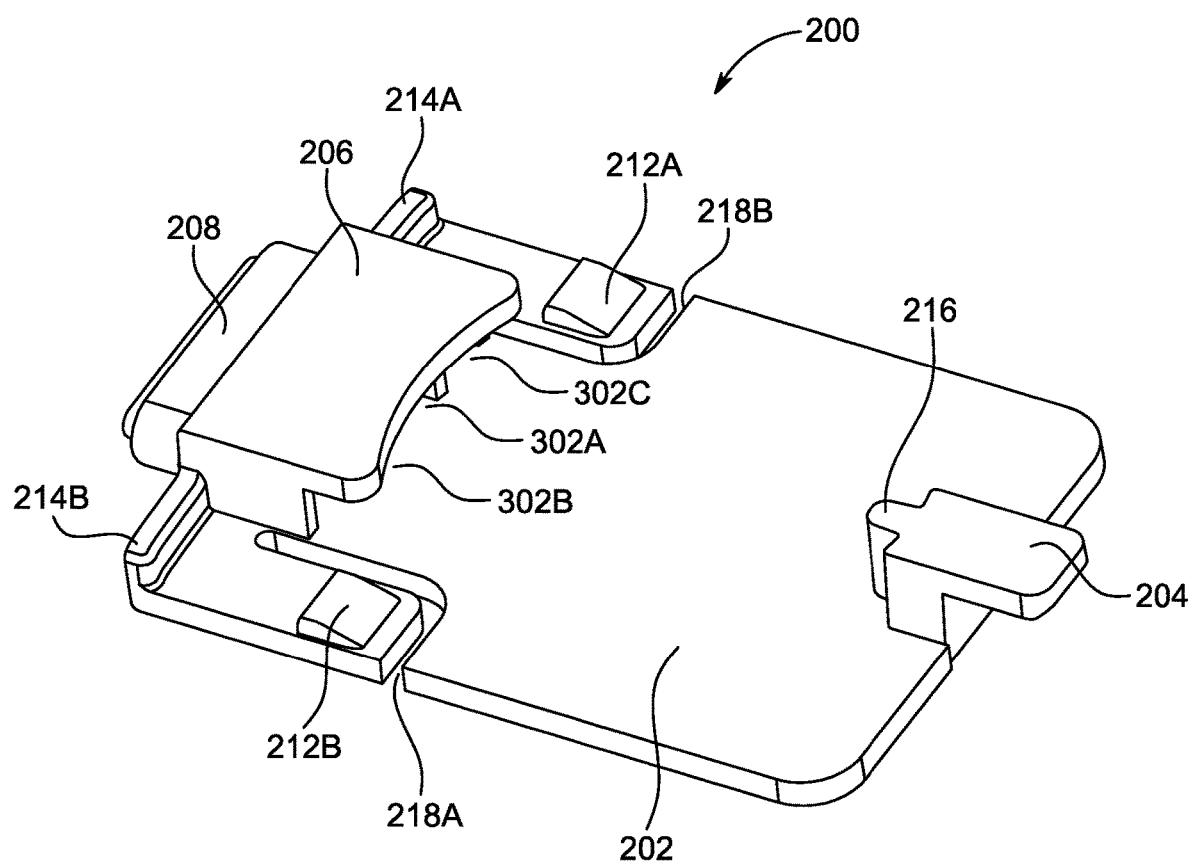
FIG. 3A is a top side perspective view of a latch according to some embodiments of the disclosure.
Figure 3C:
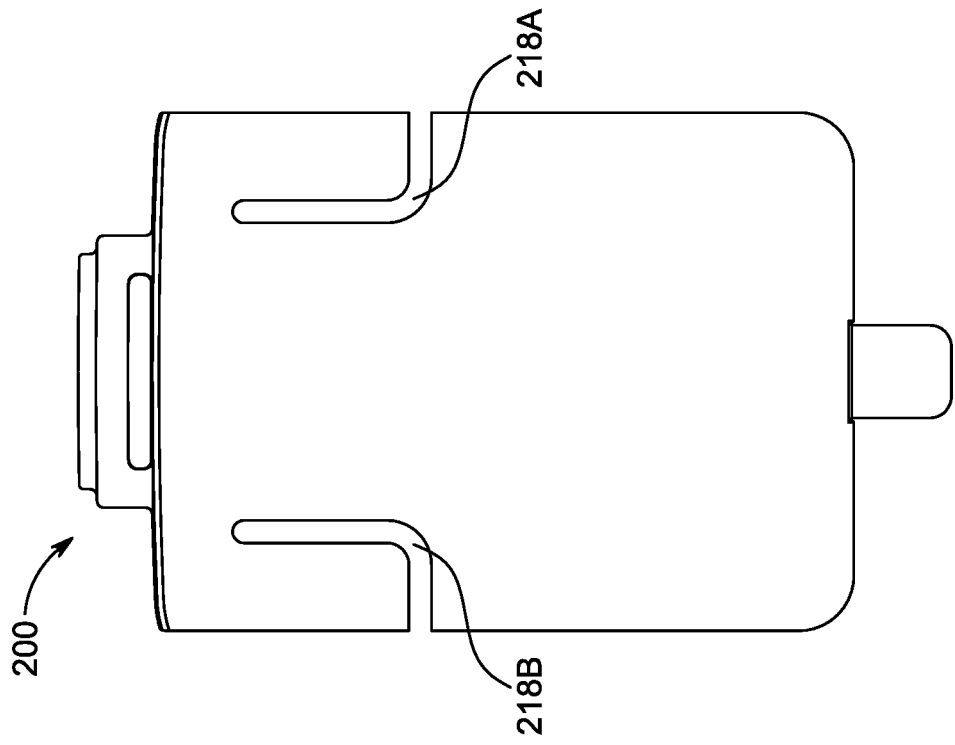
FIG. 3C is a bottom view of a latch according to some embodiments of the disclosure.
Figure 3B:
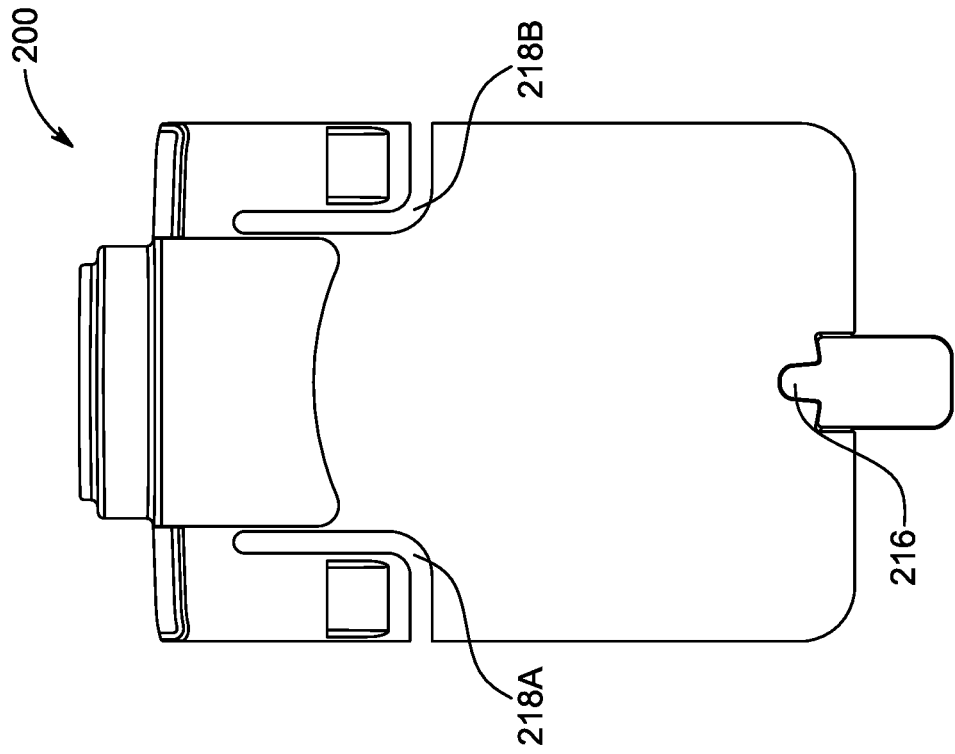
FIG. 3B is a top view of a latch according to some embodiments of the disclosure.
Figure 3D:
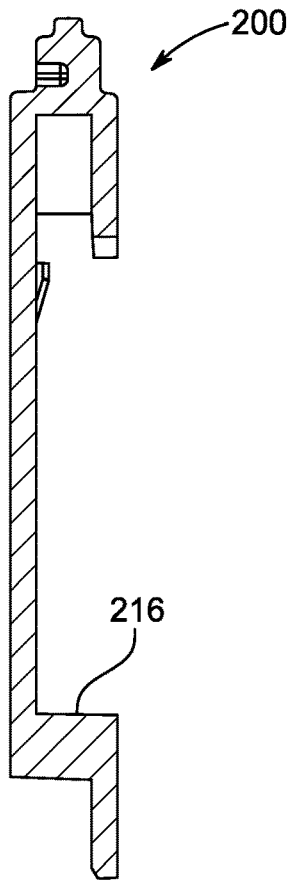
FIG. 3D is a cross-section view of a latch according to some embodiments of the disclosure.
Figure 3E:
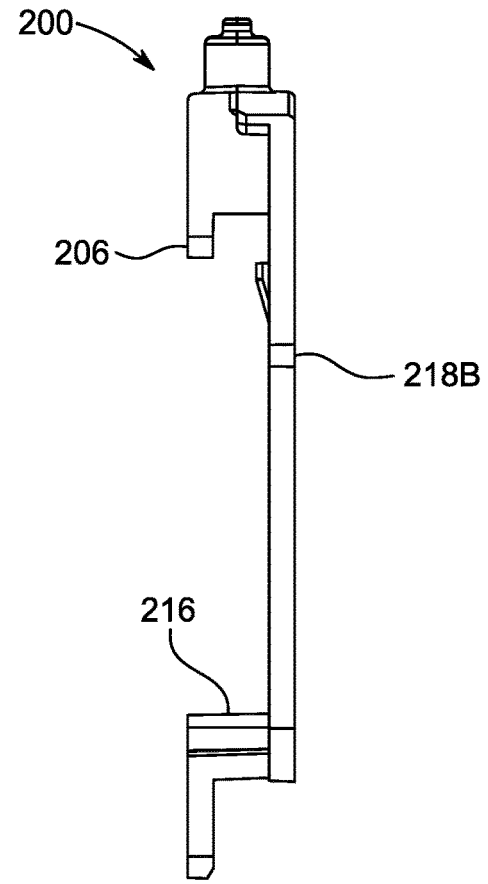
FIG. 3E is a side view of a latch according to some embodiments of the disclosure.
Figure 3F:
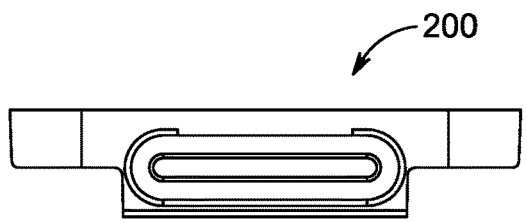
FIG. 3F is a front elevation view of a latch according to some embodiments of the disclosure.
Figure 3G:
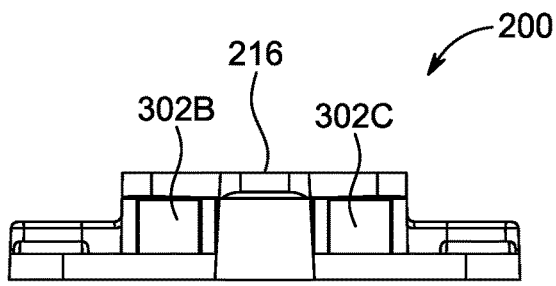
FIG. 3G is a rear elevation view of a latch according to some embodiments of the disclosure.

As illustrated in FIG. 3A, a latch 200 comprises a single structure formed via plastic injection molding. Alternatively, the latch 200 may comprise a single, stainless steel or other alloy material (e.g., SS 316L or PT 17-4PH).

Latch 200 includes a separate piece that is installed in frame 102 to provide a mounting base 300. Latch 200 includes a planar surface 202 forming the bottom surface of receiving aperture 108 when latch 200 is inserted in frame 102.

The latch 200 includes an actuator 206. In one embodiment, actuator 206 may comprise an L- or U-shaped protrusion extending from the body of latch 200, as illustrated in more detail with respect to FIGS. 3D and 3E. In the illustrated embodiment, actuator 206 allows for the manipulation of latch 200 with respect to the frame 102. Specifically, actuator 206 allows for latch 200 to be slid into or out of frame 102 along a single axis.

Upon manipulation of latch 200 using actuator 206, the actuator may be engaged with latch protrusion 112 on frame 102. In one embodiment, latch protrusion 112 on frame 102 may be coupled or fused to frame 102 and may comprise a horizontal protrusion extending outward away from receiving aperture 108. Actuator 206 may be configured to include a receptacle 302A designed to receive latch protrusion 112. Thus, when exerting an inward force on latch 200 via actuator 206, actuator 206 may be aligned and coupled to latch protrusion 112 via the receptacle such that receptacle 302A travels over protrusion 112.

Latch 200 additionally includes a locking mechanism 204 situated within locking gap 114 on frame 102. During operation, locking mechanism 204 may move laterally within locking gap 114 upon operation of the actuator 206. That is, when a user exerts force on actuator 206 pushing latch 200 toward latch protrusion 112, locking mechanism 204 may equally be displaced and travel along locking gap 114 on frame 102. Movement of latch 200 is facilitated via a spring-loaded mechanism placed between actuator 206 and frame 102.

Locking mechanism 204 may include a lock stub 216 protruding toward receiving aperture 108 in some embodiments. In the illustrated embodiment, lock stub 216 includes a planar protrusion extending inward toward actuator 206 and outward from locking mechanism 204. In operation, when a force is exerted on actuator 206 toward receiving aperture 108, the lock stub 216 may be displaced away from aperture 108. In this operation, the edges of aperture 108 may be sufficiently curved, allowing for rotational movement of an insertion member (not illustrated). In one embodiment, rotational movement of the insertion member may also comprise rotational movement of the edge of the aperture 108. Upon removal of the force on actuator 206, the lock stub 216 may be displaced inward toward the aperture 108 and away from bar 106B. In one embodiment, an insertion member may include a lock receptacle designed to hold lock stub 216. Thus, when properly positioned, removal of the force on actuator 206 may result in the lock stub 216 being received by a lock receptacle present on an insertion member, thus retaining the insertion member.

Also shown in FIGS. 3A to 3E, latch 200 may include a plurality of wedges 212A, 212B. In the illustrated embodiment, wedges 212A and 212B may be inserted into respective wedge receptacles 116A, 116B on the underside of frame 102. Thus, in operation, wedges 212A and 212B may be slide under frame 102 and inserted into wedge receptacles 116A, 116B such that latch 200 is positioned flush with frame 102.

As illustrated in FIG. 3A, actuator 206 may include one or more openings 302A, 302B, and 302C. In one embodiment, opening 302A may be configured to receive latch protrusion 112 while openings 302B and 302C may be configured to receive compression springs 210A, 210B, respectively. In the illustrated embodiments, compression springs 210A, 210B are placed between latch 200 and frame 102, specifically between actuator 206 and the vertical sidewall of frame 102 (via pegs 110A, 110B). In one embodiment, compression springs 210A, 210B may be fixedly attached either to the vertical sidewall of frame 102 or to actuator 206 (via openings 302B, 302C). In alternative embodiments, compression springs 210A, 210B may not be physically connected to the vertical side wall of frame 102 or to actuator 206 and instead may be rested on latch 200 (or within openings 302B, 302C) prior to the coupling of latch 200 into frame 102.

As discussed previously, the use of compression springs 210A, 210B allows the assembly 100 to be retained in a "locked" or "latched" position until a force is applied to actuator 206. Latch 200 slides into frame 102 until wedges 212A and 212B engage wedge receptacles 116A, 116B on the bottom side of frame 102. Thus, upon activation of wedges 212A and 212B, the compression springs 210A, 210B are partially compressed and apply an outward force on actuator 206, which is counteracted by positioning of the wedges 212A and 212B. In this state, the lock stub 216 positioned on lock mechanism 118 extends past the curved surface of receiving aperture 108, thus preventing rotational movement of an insertion member such as a foot on a portable electronic device that extends into the receiving aperture.

Subsequently, if a user attempts to rotate the insertion member on the portable electronic device with respect to the edges of the aperture 108, the user must exert an inward force on actuator 206. Upon exertion of this force, compression springs 210A, 210B may be compressed further and lock mechanism 118 (including lock stub 216) may be forced outward from aperture 108, thus removing lock stub 216 from the curved plane formed by the edge of the aperture 108. Thus, upon activation of the actuator 206, the curved surface of the aperture is unbroken and a circular insertion member may be rotated and positioned.

Upon release of actuator 206, the compression springs 210A, 210B decompress, thus forcing the lock mechanism and lock stub 216 inward toward receiving aperture 108. Prior to releasing actuator 206, the user may properly position the insertion member of the portable electronic device such that a lock receptacle, or socket, is aligned with lock stub 216 and receives lock stub 216 into the lock receptacle. Upon insertion of the lock stub 216 into the lock receptacle, the insertion member may be fixedly retained and may not be rotated while actuator is not depressed. Alternatively, lock stub 216 may be configured to prevent upward movement of the insertion member, thus forming a gate-like lock.

Figure 4:
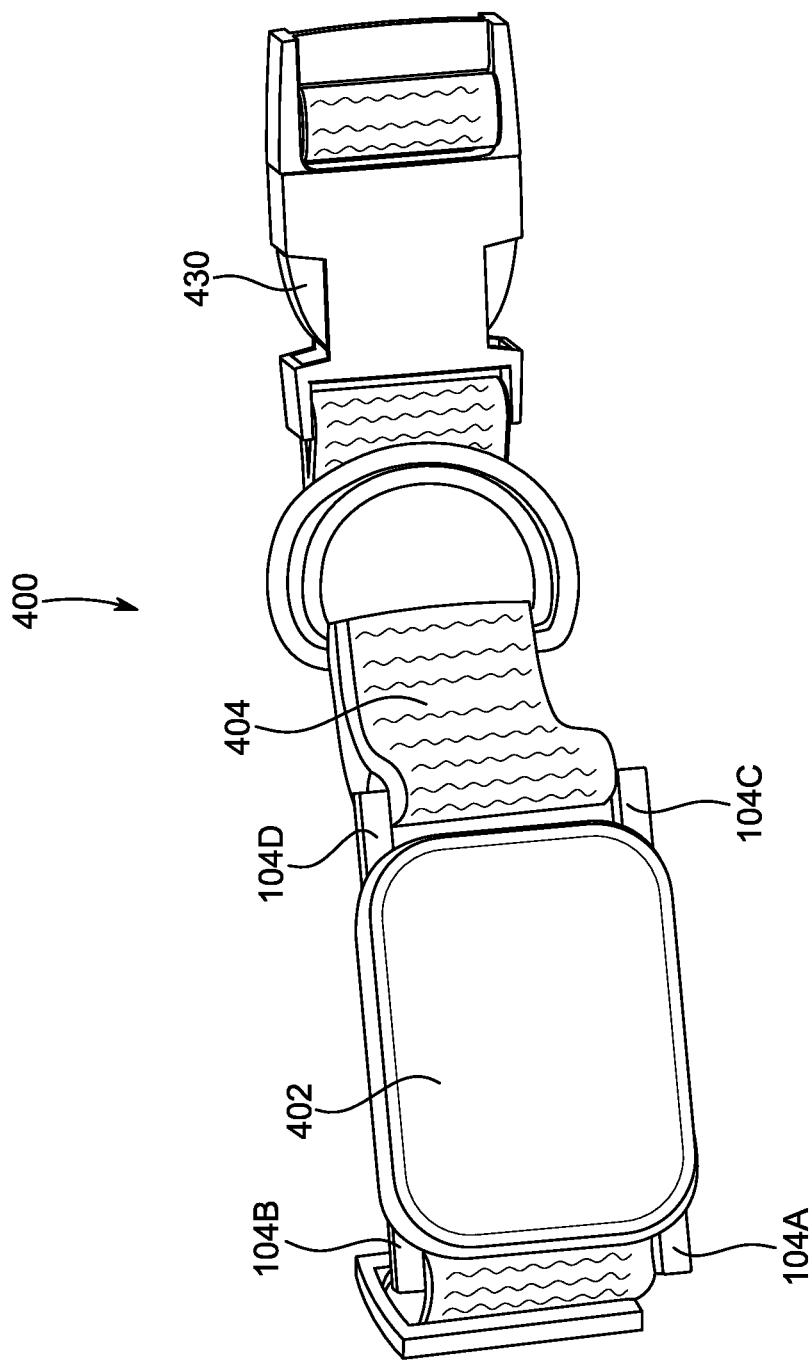
FIG. 4 is an illustration of an accessory assembly and portable electronic device coupled to a collar according to some embodiments of the disclosure.

FIG. 4 is an illustration of an animal collar apparatus 400 including a portable electronic device 402 installed on a mounting base in according to some embodiments of the disclosure.

The collar apparatus 400 illustrated in FIG. 4 may comprise any type of strap 404 or other material and is not intended to limit the scope of the disclosure. In the illustrated embodiment, the collar strap 404 comprises an animal collar. In some embodiments, the collar strap 404 may comprise a third-party strap or material or may be provided with the assembly.

The portable electronic device 402 is mounted onto a mounting base including a frame and a latch as previously set forth herein. The frame is indicated by the presence first and second legs 104A, 104B extending from a first end of the frame and third and fourth legs 104C, 104D extending from a second end of the frame outwardly from behind portable electronic device 402. In the illustrated embodiment, the portable electronic device 402 comprises a portable computing device 402 that can detect and record data associated with the movement of the wearer (i.e., pet) of the collar apparatus 400.

As discussed above, the portable electronic device 402 is removable from the mounting base by moving the latch to an unlatched position and rotating the portable electronic device relative to the frame such that an insertion portion of the portable electronic device 402 disengages from the frame and allows the insertion portion to be released out of the receiving aperture 108.

Figure 5A:
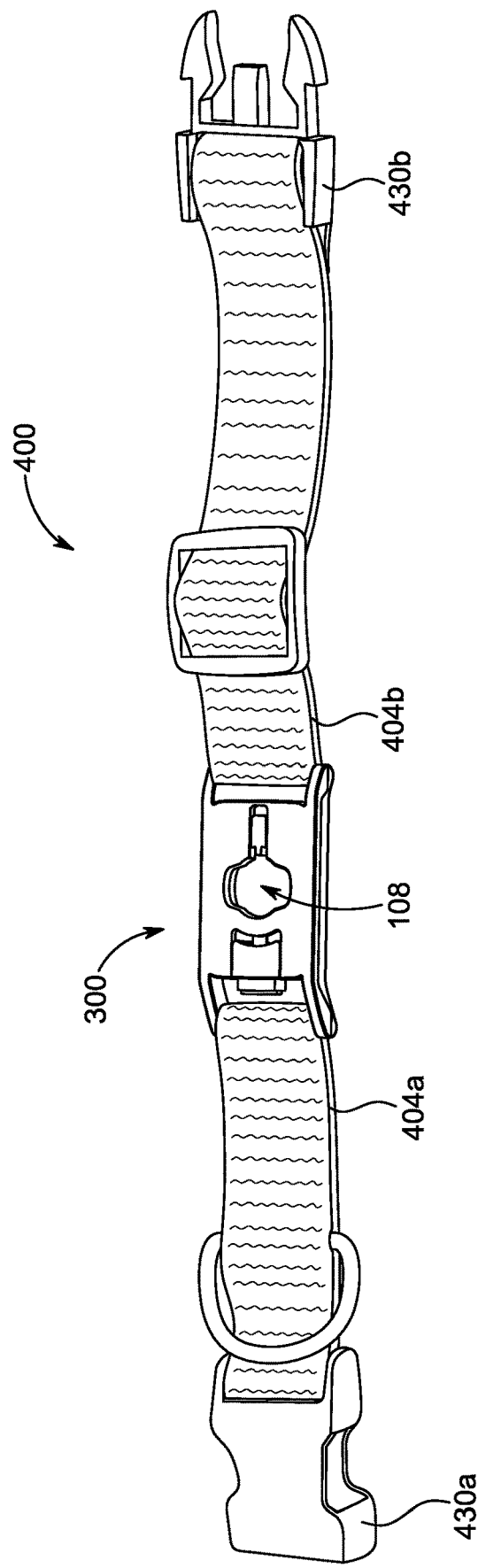
FIG. 5A illustrates a top perspective view of a collar apparatus including a collar strap, a buckle and a base including a latch and a frame in accordance with some embodiments of the disclosure.
Figure 5B:
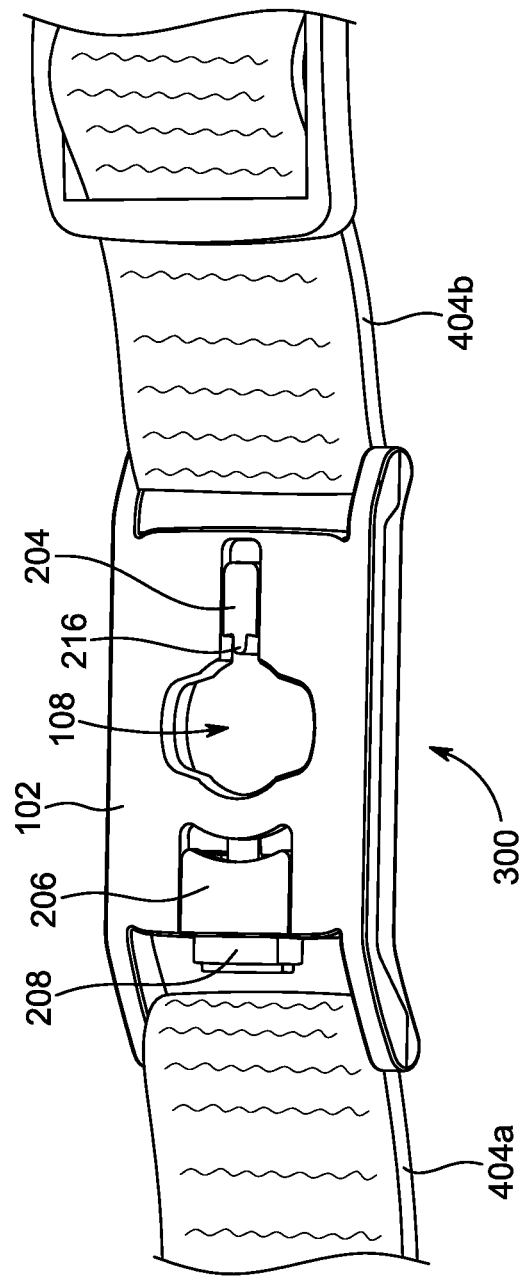
FIG. 5B illustrates a top detail view of the collar apparatus of FIG. 5A showing a mounting base having a frame and latch in accordance with some embodiments of the present disclosure.

FIGS. 5A and 5B are illustrations of a collar apparatus 400 including a mounting base 300. A first strap end 404a on the collar strap is attached to a first bar on a first end of the mounting base 300, and a second strap end 404b on the collar strap is attached to a second bar on a second end of the mounting base 300. Collar apparatus 400 also includes a buckle having a first buckle member 430a and a second buckle member 430b. The first and second buckle members 430a, 430b are complimentary and may be joined to secure the collar apparatus 400 to an animal's body. The collar apparatus 400 includes a receiving aperture 108 on mounting base 300. The receiving aperture 108 is configured to receive an insertion member of a portable electronic device. In some embodiments, collar apparatus 400 is sold as a standalone item to provide an accessory assembly for a user. In different applications, users may want to own several collars with different colors, patterns, sizes, etc. Such configurations allow different collars to be used with a singular portable electronic device by disengaging the portable electronic device from a first collar having a first mounting base and installing the portable electronic device on a different collar having a second mounting base. This type of modular arrangement allows multiple different collars each having a mounting base to be used interchangeably with a portable electronic device.

As shown in FIGS. 5A and 5B, receiving aperture 108 forms a keyhole window in some embodiments that has an oblong shape with a central circular aperture and additional U-shaped apertures at the top and bottom of the central circular aperture. Structural frame tabs extend from the frame over the receiving aperture 108. The frame tabs 120a, 120b, 120c shown in FIG. 1C are positioned to retain the insertion member on the portable electronic device 402 in the receiving aperture 108 when the portable electronic device is inserted and rotated into a locked position. Additionally, as shown in FIG. 5B, the lock stub 216 is positioned to extend toward the receiving aperture 108 when the latch is in a latched position.

Figure 6:
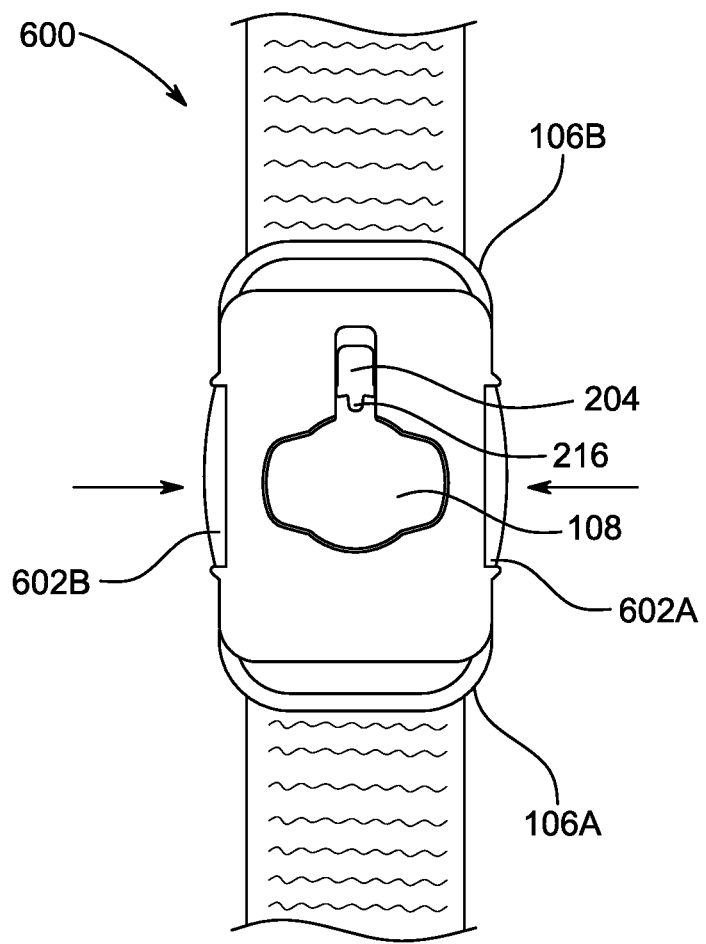
FIG. 6 is an illustration of an alternative embodiment of a collar apparatus including a mounting base having a frame and a latch.

Referring to FIG. 6, an illustration of an alternative embodiment of an accessory assembly is shown. The collar assembly 600 includes a mounting base configured to receive an attachment of portable electronic device. Collar assembly 600 utilizes two buttons 602A, 602B on the sides of the assembly. Specifically, in lieu of wedges 212A, 212B, the latch includes side wall wedges that are depressed when inserting the latch. Upon fixing the latch position, the side wall wedges return to their non-depressed state and latch onto slots on the side of the frame of the assembly. Collar assembly 600 includes a lock mechanism 204 and a lock stub 216 positioned to advance toward the receiving aperture 108 when the latch is in the latched position. The frame on the collar assembly 600 shown in FIG. 6 also includes a first bar 106A and a second bar 106B each configured for attachment to a strap end on the collar. First and second bars 106A, 106B extend from the frame and allow a strap to be attached to the mounting base. In the alternative embodiment shown in FIG. 6, a user may depress first and second buttons 602A, 602B simultaneously on the latch to release the latch and to move the latch to an unlatched position. Once the latch is in an unlatched position, the insertion portion of a portable electronic device positioned in the receiving aperture 108 may be rotated and released from the attachment to the mounting base.

Figure 7A:
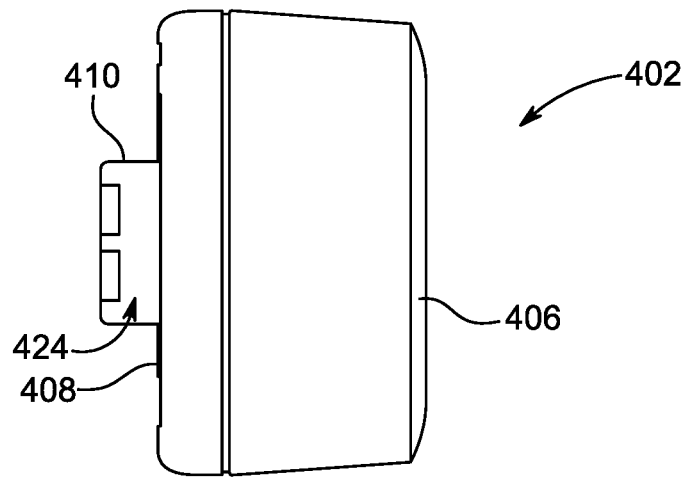
FIG. 7A is a side view of an embodiment of a portable electronic device for attachment to a mounting base on a collar apparatus in according to some embodiments of the disclosure.
Figure 7B:
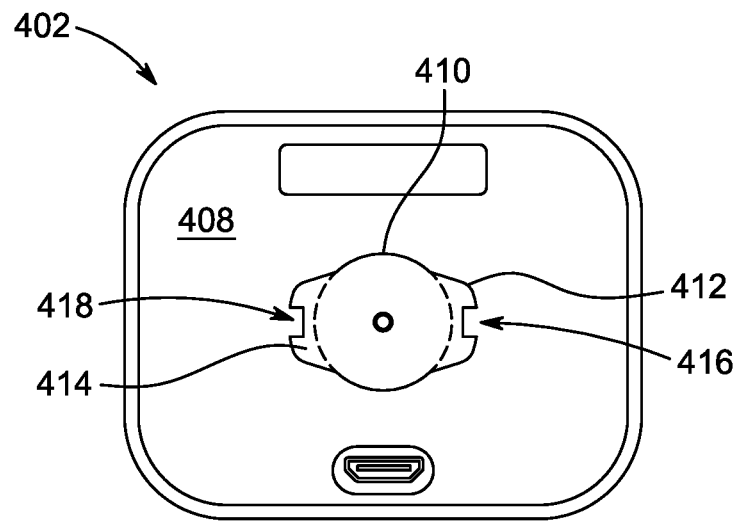
FIG. 7B is a bottom view of an embodiment of a portable electronic device for attachment to a mounting base on a collar apparatus according to some embodiments of the disclosure.
Figure 7C:
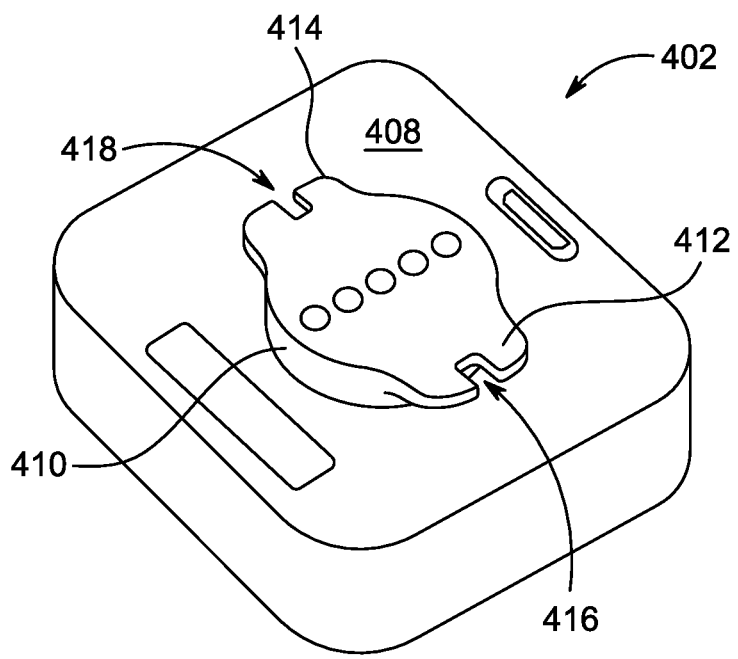
FIG. 7C is a detail perspective bottom view of a portable electronic device for attachment to a mounting base on a collar apparatus according to some embodiments of the disclosure.

Referring to FIGS. 7A to 7C, an embodiment of a portable electronic device 402 is shown in various embodiments. Portable electronic device 402 is configured for attachment to a mounting base. Device 402 includes a housing forming the shape of a rectangular solid in some embodiments. In other embodiments, device 402 may include other suitable shapes. Device 402 includes a top side 406 and a bottom side 408. Bottom side 408 is generally configured for placement against a mounting base on a collar. An insertion portion 410, or foot, protrudes from the bottom side 408 of the device 402. Insertion portion 410 is configured for insertion into the receiving aperture 108 on the frame 102 and mounting base 300.

The insertion portion 410 includes a first flange 412 protruding laterally from insertion portion 410 and includes a second flange 414 opposite the first flange 412 also protruding laterally from insertion portion 410. First and second flanges 412, 414 are shaped to correspond to the shape of the keyhole opening in receiving aperture 108 on frame 102.

The first and second flanges 412, 414 protrude from insertion portion 410 at a position spaced from the bottom side 408 of device 402. As such, a gap 424 is defined between each of first and second flanges 412, 414 and the bottom side 408 of device 402. Gap 424 is positioned to receive one or more tab structures 120 on frame 102 protruding into receiving aperture 108. In some embodiments, a first gap is defined between first flange 412 and the bottom side 408 of device 402, and a second gap is defined between second flange 414 and the bottom side 408 of device 402. First gap may receive first and second tabs 120a, 120b and second gap may receive third tab 120c when the insertion portion 410 is inserted into and rotated in the receiving aperture 108 of mounting base 300.

Referring further to FIGS. 7A to 7C, first flange 412 includes a first socket 416 in some embodiments. First socket 416 defines a recess shaped to accommodate lock stub 216 on the latch 200. Similarly, second flange 414 includes a second socket 418 in some embodiments. Second socket 418 defines a recess shaped to accommodate lock stub 216 on the latch 200. During use, when insertion portion 410 of device 402 is received in receiving aperture 108 and rotated, lock stub 216 is received in the first socket 416 or the second socket 418. The selection of the first socket 416 or second socket 418 will depend on the orientation of the insertion portion 410 when initially inserted into the receiving aperture 108.

Figure 8A:
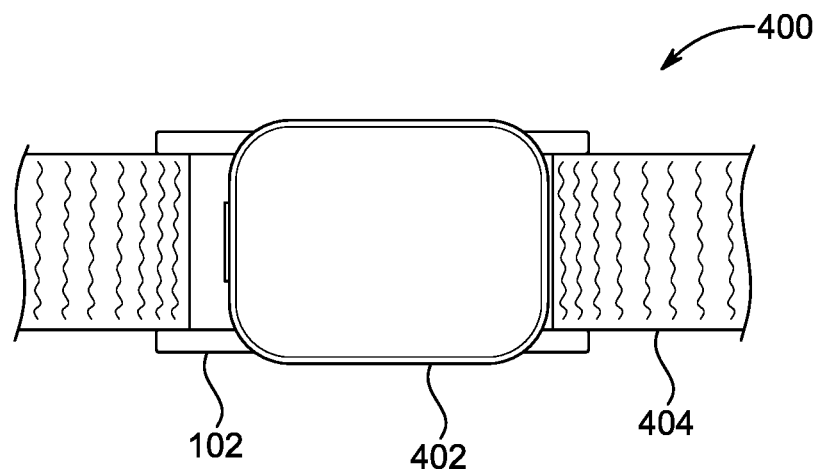
FIG. 8A is a top view of an embodiment of an accessory assembly including a frame, collar and portable electronic device installed on the frame in accordance with some embodiments of the disclosure.
Figure 8B:
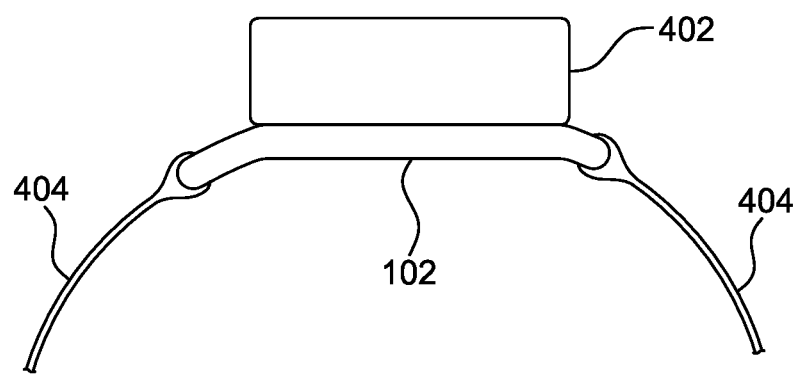
FIG. 8B is a side view of an embodiment of an accessory assembly including a frame, collar and portable electronic device installed on the frame in accordance with some embodiments of the disclosure.

Referring further to FIGS. 8A to 8D, various views of a collar assembly 400 including a collar strap 404, a mounting base and a portable electronic device are shown. As seen in FIG. 8A, a collar assembly 400 includes a strap 404 attached to a frame 102. A portable electronic device 402 is mounted on the frame. Similarly, as seen in FIG. 8B, a portable electronic device 402 is shown positioned on a mounting base on a collar strap 404. The device 402 is mounted on the frame 102 of the mounting base. As seen in FIG. 8B, the device 402 sits above the frame 102 such that the device 402 extends above the mounting base. Alternatively, if positioned on an animal, the device 402 may be positioned below the mounting base and frame 102 if the collar is rotated around the animal's neck such that the weight of the device 402 causes the device to hang downward on the collar.

Figure 8C:
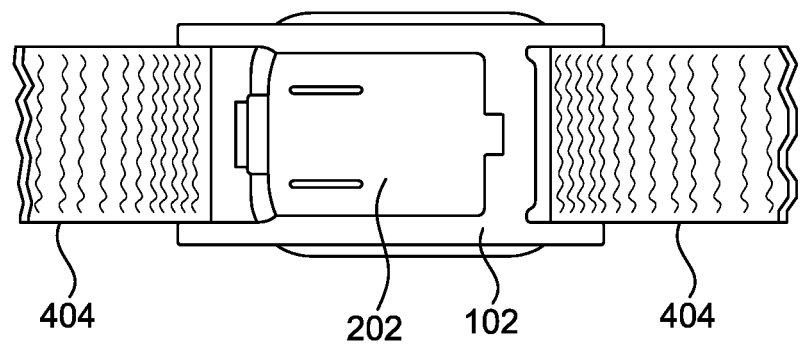
FIG. 8C is a bottom view of an embodiment of an accessory assembly including a frame, collar and portable electronic device installed on the frame in accordance with some embodiments of the disclosure.
Figure 8D:
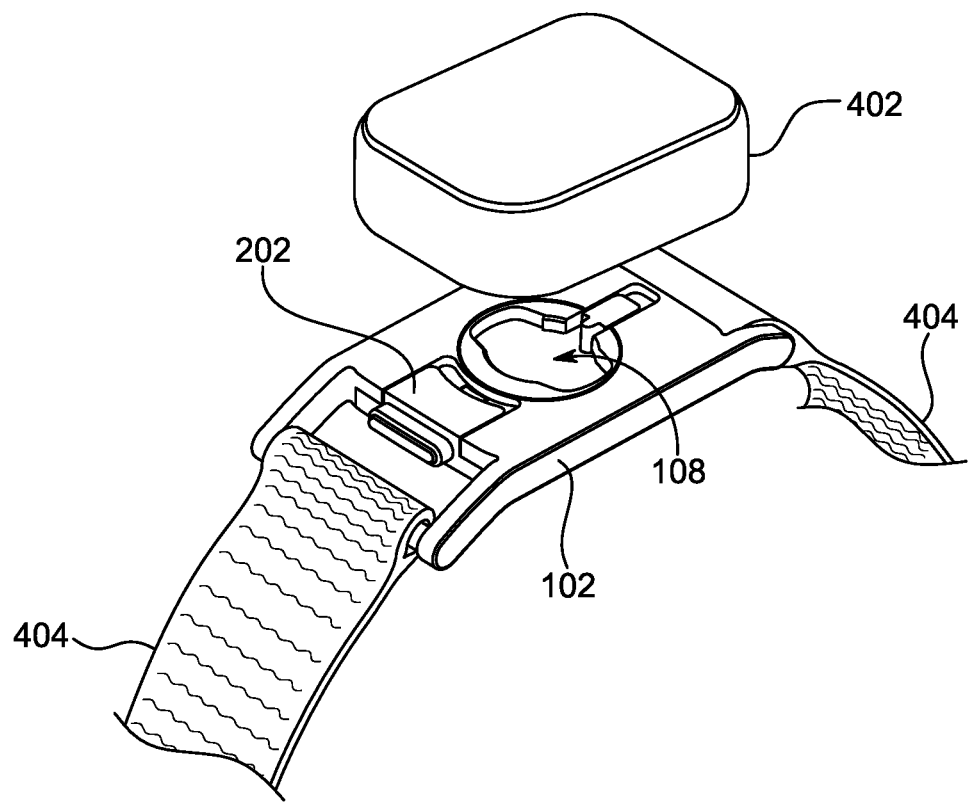
FIG. 8D is a top partially-exploded perspective view of an embodiment of an accessory assembly including a frame, collar and portable electronic device positioned above the frame in accordance with some embodiments of the disclosure.
Figure 8E:
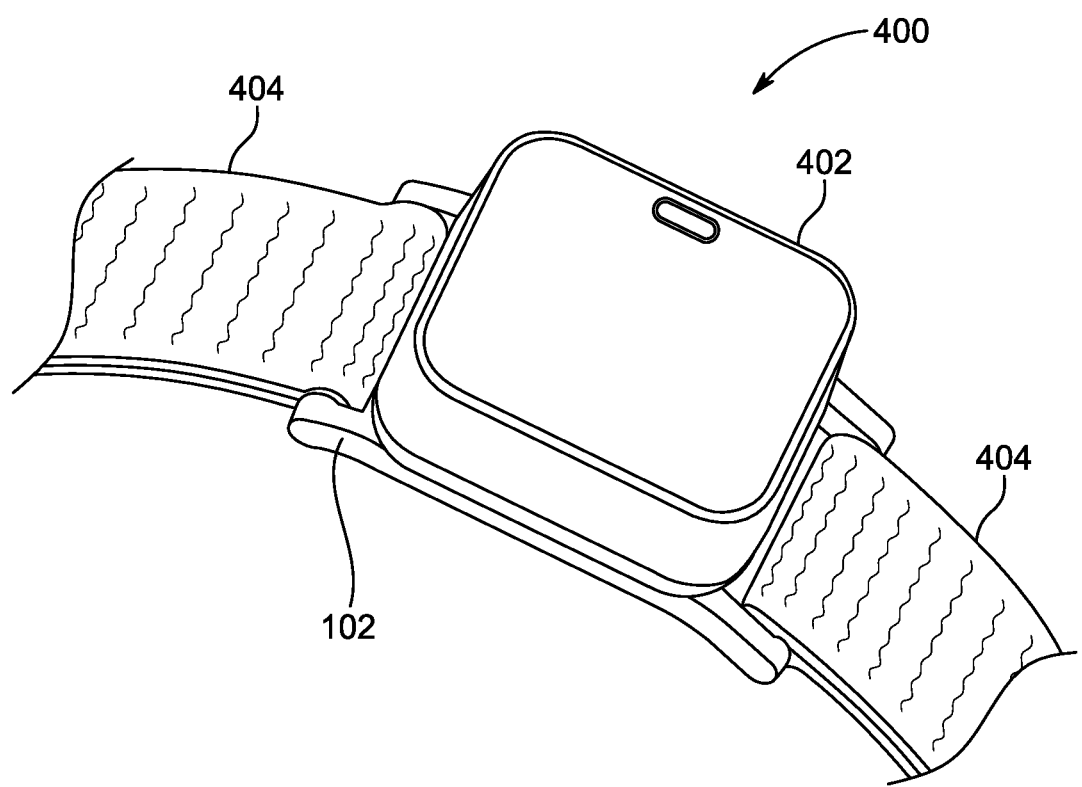
FIG. 8E is a top perspective view of an embodiment of an accessory assembly including a frame, collar and portable electronic device positioned on the frame in accordance with some embodiments of the disclosure.

As shown in FIG. 8C, the underside of a collar is shown, illustrating the frame 102 and the moveable latch including a planar bottom surface 202. The latch is moveable between a latched position and an unlatched position. Referring to FIG. 8D, a portable electronic device 402 is shown in a position above the mounting base prior to attachment onto the frame. The device 402 is configured for its insertion portion 410 to be installed into the receiving aperture 108 on frame 102 such that latch 200 engages a corresponding structure on the device 402. The device 402 may need to be rotated about ninety degrees from the position shown in FIG. 8D before the insertion portion can be received in the keyhole fit of receiving aperture 108 in some configurations. The illustration shown in FIG. 8E shows the device 402 installed on the mounting base, forming a collar apparatus 400 including a collar strap 404, a mounting base with a frame 102 and a portable electronic device 402 installed on the mounting base.

Figure 9A:
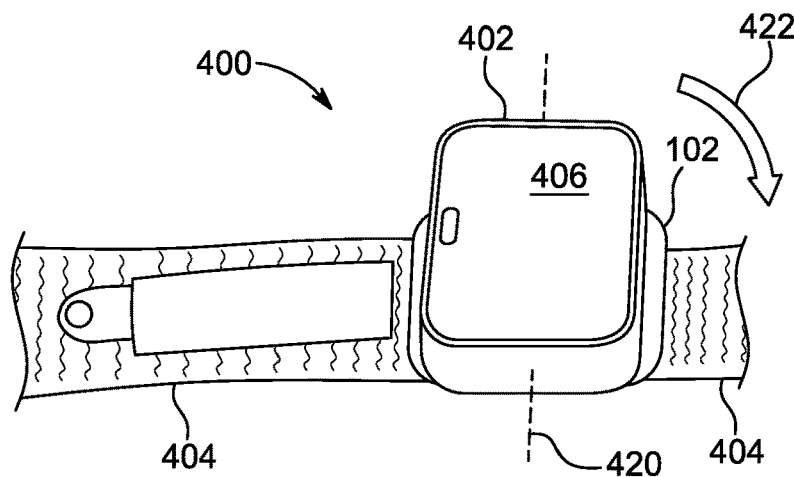
FIG. 9A is a top perspective view of an embodiment of an accessory assembly including a frame and a portable electronic device positioned for installation on the frame in accordance with some embodiments of the present disclosure.
Figure 9B:
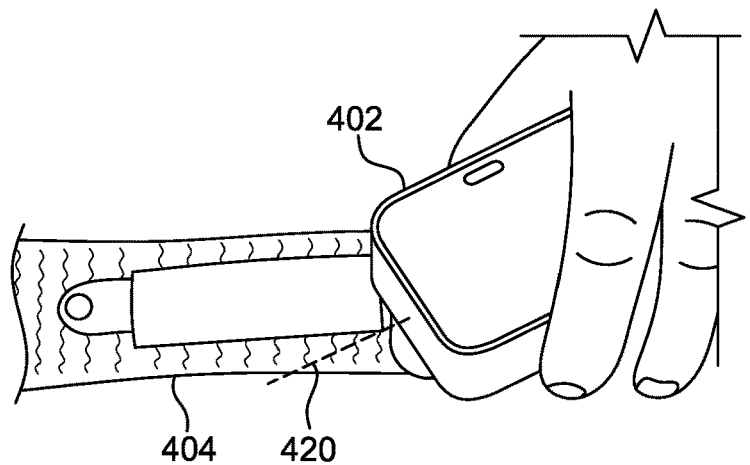
FIG. 9B is a top perspective view of an embodiment of an accessory assembly including a frame and a portable electronic device partially rotating toward a locked position during installation on the frame in accordance with some embodiments of the present disclosure.
Figure 9C:
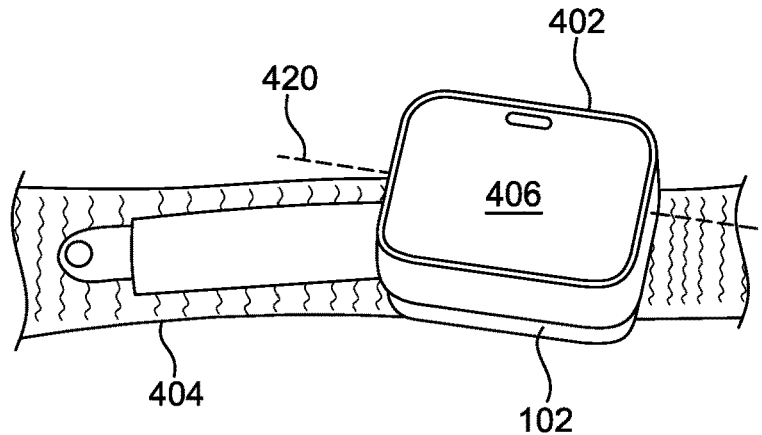
FIG. 9C is a top perspective view of an embodiment of an accessory assembly including a frame and a portable electronic device rotated from the position shown in FIGS. 9A and 9B into a locked position during installation of the portable electronic device on the frame in accordance with some embodiments of the present disclosure.

Referring to FIGS. 9A to 9C, an embodiment of a collar apparatus 400 is shown during different stages of installation of a portable electronic device 402 onto a mounting base having a frame 102. The collar apparatus 400 includes a collar strap 404 attached to opposite ends of frame 102. The portable electronic device 402 includes a major axis 420 and an upper side 406. During installation on the mounting base and frame 102, the device 402 is positioned such that the major axis 420 is about perpendicular to the direction of the collar strap, as shown in FIG. 9A in some configurations. In this position, the insertion portion 410 is pressed downward into the receiving aperture 108. The device 402 is then rotated in an angular direction 422 relative to frame 102 such that the insertion portion 410 and first and second flanges 412, 414 rotate relative to the frame 102 as shown in FIG. 9B. The first and second flanges 412, 414 travel beneath the tabs 120a, 120b, 120c during rotation such that one or more tabs become positioned in the gaps between each flange and the bottom side 408 of the device 402. In some embodiments, device 402 is rotated until the major axis 420 is rotated about ninety degrees relative to the initial insertion position, as shown in FIG. 9C until the lock stub 216 engages in the first or second socket 416, 418 and the latch enters a latched position. In other embodiments, the device 402 may be rotated across any suitable angular range of rotation.

In some embodiments, the portable electronic device 402 is placed on top of frame 102 while the latch 200 is pressed inward. Upon situating the portable electronic device 402, the latch 200 is released, causing the locking mechanism to engage the device, retaining it in place. In other embodiments, it is not necessary to manually depress the actuator on the latch during installation of the device 402 onto the frame 102. Due to the ramped or tapered shape of the first and second flanges 412, 414, when the device 402 is rotated manually as shown in FIGS. 9A to 9C, the lock stub 216 will slide along the edge of the first or second flange 412, 414 and seat automatically into the first or second socket 416, 418 without having to manually depress the actuator 206 or button 208 on the latch 200.

In further embodiments, the present disclosure provides a method of attaching a portable electronic device to a mounting base on a collar. The method includes the steps of (a) providing a base having a frame and a latch that is moveable relative to the frame between a latched position and an unlatched position, wherein the latch is biased in the latched position, the frame defining a receiving aperture shaped to receive a corresponding foot on the portable electronic device, the frame including a frame tab protruding from the frame into the receiving aperture, the foot further including a socket defined in the foot shaped to receive a lock stub on the latch; (b) inserting the foot into the receiving aperture; (c) rotating the portable electronic device such that the foot interferes with the tab to secure the device onto the mounting base; and (d) engaging the lock stub of the latch into the socket on the foot during rotation such that the lock stub prevents counter-rotation of the portable electronic device.

In further embodiments, the present disclosure includes an animal collar apparatus for attaching a portable electronic device, the collar apparatus comprising: a collar strap having a first end and a second end; a mounting base attached to the collar strap, the mounting base including a frame and a latch disposed on the frame, wherein the latch is moveable relative to the frame between a latched position and an unlatched position, wherein the latch is biased in the latched position on the frame; a receiving aperture defined in the frame; a first tab protruding from the frame into the receiving aperture; and a lock stub disposed on the latch biased toward the receiving aperture, wherein the lock stub and the first tab are positioned to engage the portable electronic device when the latch is in the latched position and the portable electronic device is installed on the base, and wherein the base is configured to receive the portable electronic device in a rotational engagement.

In further embodiments, the present disclosure includes an animal collar apparatus for attaching a portable electronic device, the collar apparatus comprising: a collar strap having a first end and a second end; a mounting base attached to the collar strap, the mounting base including a frame and a latch disposed on the frame, wherein the latch is moveable relative to the frame between a latched position and an unlatched position, wherein the latch is biased in the latched position on the frame; a receiving aperture defined in the frame; a first tab protruding from the frame into the receiving aperture; and a lock stub disposed on the latch biased toward the receiving aperture, wherein the lock stub and the first tab are positioned to engage the portable electronic device when the latch is in the latched position and a portion of the portable electronic device is installed on the base, further comprising an actuator on the latch positioned to release the lock stub from the portable electronic device and to release the portable electronic device from the base when the actuator is moved toward the receiving aperture.

In further embodiments, the present disclosure provides an apparatus for attaching a portable electronic device, the apparatus comprising a mounting base including a frame and a latch, wherein the latch is moveable relative to the frame between a latched position and an unlatched position, the frame defining a receiving aperture shaped to receive a portion of the portable electronic device; an actuator on the latch positioned such that the actuator is operable to move the latch from the latched position to the unlatched position when pushed toward the receiving aperture; a lock stub disposed on the latch protruding toward the receiving aperture and positioned to engage a portion of the portable electronic device when the portable electronic device is installed on the mounting base and rotated relative to the mounting base, further comprising a frame tab extending from the frame into the receiving aperture, wherein the frame tab engages a portion of the portable electronic device when the portable electronic device is installed on the mounting base in a locked position.

In further embodiments, the present disclosure provides an apparatus for attaching a portable electronic device, the apparatus comprising a mounting base including a frame and a latch, wherein the latch is moveable relative to the frame between a latched position and an unlatched position, the frame defining a receiving aperture shaped to receive a portion of the portable electronic device; an actuator on the latch positioned such that the actuator is operable to move the latch from the latched position to the unlatched position when pushed toward the receiving aperture; a lock stub disposed on the latch protruding toward the receiving aperture and positioned to engage a portion of the portable electronic device when the portable electronic device is installed on the mounting base and rotated relative to the mounting base, wherein the lock stub is biased toward the receiving aperture and prevents counter-rotation of the portable electronic device relative to the frame when the portable electronic device is installed on the mounting base in a locked position.

In further embodiments, the present disclosure provides an apparatus for attaching a portable electronic device, the apparatus comprising a mounting base including a frame and a latch, wherein the latch is moveable relative to the frame between a latched position and an unlatched position, the frame defining a receiving aperture shaped to receive a portion of the portable electronic device; an actuator on the latch positioned such that the actuator is operable to move the latch from the latched position to the unlatched position when pushed toward the receiving aperture; a lock stub disposed on the latch protruding toward the receiving aperture and positioned to engage a portion of the portable electronic device when the portable electronic device is installed on the mounting base and rotated relative to the mounting base, wherein the portable electronic device is retained on the mounting base by an engagement between a portion of the portable electronic device and both the lock stub and the frame tab.

In further embodiments, the present disclosure provides an apparatus for attaching a portable electronic device, the apparatus comprising a mounting base including a frame and a latch, wherein the latch is moveable relative to the frame between a latched position and an unlatched position, the frame defining a receiving aperture shaped to receive a portion of the portable electronic device; an actuator on the latch positioned such that the actuator is operable to move the latch from the latched position to the unlatched position when pushed toward the receiving aperture; a lock stub disposed on the latch protruding toward the receiving aperture and positioned to engage a portion of the portable electronic device when the portable electronic device is installed on the mounting base and rotated relative to the mounting base, wherein the lock stub disengages from a portion of the portable electronic device when the latch is moved to the unlatched position.

The preceding figures include elements having the same numerals. The description and various embodiments is not repeated for each figure but is incorporated by reference. Those elements in different figures having the same numerals are presumed to be identical to other, same-numbered elements.

Those skilled in the art will recognize that the devices of the present disclosure may be implemented in many manners and as such are not to be limited by the foregoing exemplary embodiments and examples. In this regard, any number of the features of the different embodiments described herein may be combined into single or multiple embodiments, and alternate embodiments having fewer than, or more than, all of the features described herein are possible.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. An animal collar apparatus for attaching a portable electronic device, the collar apparatus comprising:
    a collar strap having a first end and a second end;
    a mounting base attached to the collar strap, the mounting base including a frame and a latch disposed on the frame, wherein the latch is moveable relative to the frame between a latched position and an unlatched position, wherein the latch is biased in the latched position on the frame;
    first and second legs in spaced relation extending from the mounting base toward the first end of the collar strap;
    third and fourth legs in spaced relation extending from the mounting base toward the second end of the collar strap, wherein the third and fourth legs have a different length than the first and second legs;
    a receiving aperture defined in the frame;
    a first tab protruding from the frame into the receiving aperture; and
    a lock stub disposed on the latch biased toward the receiving aperture, wherein the lock stub and the first tab are positioned to engage a portion of the portable electronic device when the latch is in the latched position and the portable electronic device is installed on the mounting base and wherein the lock stub is configured to slide along an edge of the portable electronic device as the portable electronic device is rotated during installation on the mounting base and to automatically be received within a portion of the portable electronic device without actuating the latch.

2. The apparatus of claim 1, further comprising:
    a first bar spanning between the first and second legs, wherein the first end of the collar strap engages the first bar.

3. The apparatus of claim 2, further comprising:
    a second bar spanning between the third and fourth legs, wherein the second end of the collar strap engages the second bar.

4. The apparatus of claim 3, wherein the first and second legs form a slope toward the first bar and wherein the third and fourth legs form a slope toward the second bar.

5. The apparatus of claim 3, wherein each of the first bar and the second bar is part of the frame.

6. The apparatus of claim 1, wherein the base is configured to receive the portable electronic device in a rotational engagement.

7. The apparatus of claim 6, further comprising an actuator on the latch positioned to release the lock stub from the portable electronic device when the actuator is moved toward the receiving aperture.

8. The apparatus of claim 7, further comprising a buckle for securing the apparatus to an animal.

9. The apparatus of claim 1, wherein each of the first, second, third, and fourth legs is fastened or welded to the frame.

* * * * *